United States Patent
Donderici (10) Patent No.: US 10,215,884 B2
(45) Date of Patent: Feb. 26, 2019

(54) BOREHOLE ACOUSTIC NOISE MEASUREMENT AND PROCESSING

(75) Inventor: Burkay Donderici, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 529 days.

(21) Appl. No.: 14/237,240

(22) PCT Filed: Aug. 17, 2011

(86) PCT No.: PCT/US2011/048135
§ 371 (c)(1),
(2), (4) Date: Feb. 5, 2014

(87) PCT Pub. No.: WO2013/025214
PCT Pub. Date: Feb. 21, 2013

(65) Prior Publication Data
US 2014/0195188 A1 Jul. 10, 2014

(51) Int. Cl.
G01V 1/00 (2006.01)
G01V 13/00 (2006.01)
G01V 1/48 (2006.01)
G01V 1/40 (2006.01)

(52) U.S. Cl.
CPC .......... *G01V 13/00* (2013.01); *G01V 1/40* (2013.01); *G01V 1/48* (2013.01)

(58) Field of Classification Search
USPC ........................................ 702/103; 367/35
See application file for complete search history.

(56) References Cited

U.S. PATENT DOCUMENTS

| 4,114,721 A | 9/1978 | Glenn, Jr. |
| 4,831,600 A * | 5/1989 | Hornby .............. G01V 1/50 367/31 |
| 4,888,740 A | 12/1989 | Brie et al. |
| 5,191,557 A | 3/1993 | Rector et al. |
| 5,467,320 A | 11/1995 | Maki, Jr. |
| 6,581,010 B2 * | 6/2003 | Dubinsky .............. E21B 43/08 175/45 |
| 6,614,360 B1 * | 9/2003 | Leggett, III .......... E21B 44/00 340/853.1 |

(Continued)

FOREIGN PATENT DOCUMENTS

| EP | 0500142 A2 | 8/1992 |
| WO | WO-2008/150253 A1 | 12/2008 |
| WO | WO-2013025214 A1 | 2/2013 |

OTHER PUBLICATIONS

"Australian Application Serial No. 2011375000, Subsequent Examiners Report dated Mar. 31, 2015", 3 pgs.
(Continued)

*Primary Examiner* — James R Hulka
(74) *Attorney, Agent, or Firm* — Gilliam IP PLLC (57) ABSTRACT

In some embodiments, an apparatus and a system, as well as a method and an article, may operate to acquire acoustic noise data by one or more receivers, the acoustic noise provided by a passive source comprising a down hole tool body moving within a borehole, and/or a positioning device or a measurement device attached to the tool body. Additional operations may include processing the acoustic noise data to determine receiver calibration parameters, and/or formation properties. Additional apparatus, systems, and methods are disclosed.

20 Claims, 9 Drawing Sheets

(56) References Cited

U.S. PATENT DOCUMENTS

| | | | | |
|---|---|---|---|---|
| 7,310,580 | B2* | 12/2007 | Zhou | G01V 1/50 |
| | | | | 702/6 |
| 7,554,882 | B2* | 6/2009 | Garcia-Osuna | G01V 13/00 |
| | | | | 367/13 |
| 7,773,456 | B2* | 8/2010 | Hornby | G01V 1/40 |
| | | | | 367/38 |
| 2002/0092701 | A1* | 7/2002 | Norris | G01V 1/42 |
| | | | | 181/102 |
| 2003/0014190 | A1 | 1/2003 | Dubinsky et al. | |
| 2003/0151975 | A1 | 8/2003 | Zhou et al. | |
| 2004/0059511 | A1 | 3/2004 | Thomann et al. | |
| 2005/0173111 | A1* | 8/2005 | Bostick, III | E21B 47/011 |
| | | | | 73/152.16 |
| 2007/0127311 | A1 | 6/2007 | Garcia-Osuna et al. | |
| 2008/0080308 | A1 | 4/2008 | Hornby | |
| 2008/0175101 | A1* | 7/2008 | Saenger | G01V 1/28 |
| | | | | 367/43 |
| 2010/0274489 | A1* | 10/2010 | Horne | G01V 1/40 |
| | | | | 702/11 |
| 2010/0312480 | A1* | 12/2010 | Hansteen | G01V 1/42 |
| | | | | 702/12 |

OTHER PUBLICATIONS

"Australian Application Serial No. 2011375000, First Examiners Report dated Oct. 16, 2014", 3 pgs.

"Australian Application Serial No. 2011375000, Response filed Mar. 3, 2015 to First Examiners Report dated Oct. 16, 2014", 15 pgs.

"Mexican Application Serial No. MX/a/2014/001847, Office Action dated Jan. 29, 2015", (w/ English Summary), 4 pgs.

"Canadian Application Serial No. 2,844,290, Office Action dated Apr. 28, 2015", 3 pgs.

"International Application Serial No. PCT/US2011/048135, International Preliminary Report on Patentability dated Mar. 4, 2014", 7 pgs.

"International Application Serial No. PCT/US2011/48135, Response filed Feb. 28, 2012 to Written Opinion dated Dec. 21, 2011", 3 pgs.

"Mexican Application Serial No. MX/a/2014/001847, Response filed Apr. 10, 2015 to Office Action dated Jan. 29, 2015", (w/ English Translation of Claims), 14 pgs.

"Australian Application Serial No. 2011375000, Response filed Jul. 31, 2015 to Subsequent Examiners Report dated Mar. 31, 2015", 12 pgs.

"International Application Serial No. PCT/US2011/48135, Search Report dated Dec. 21, 2011", 2 pgs.

"International Application Serial No. PCT/US2011/48135, Written Opinion dated Dec. 21, 2011", 4 pgs.

"European Application Serial No. 11870913.8, Extended European Search Report dated Oct. 7, 2015", 9 pgs.

Kimball, Christopher V, "Semblance Processing of Borehole Acoustic Array Data", Geophysics, 49(3), (Mar. 1984), 274-281.

* cited by examiner

BOREHOLE ACOUSTIC NOISE MEASUREMENT AND PROCESSING

PRIORITY APPLICATION

This application is a U.S. National Stage Filing under 35 U.S.C. 371 from International Application Number PCT/US2011/048135, filed on 17 Aug. 2011, and published as WO 2013/025214 A1 on 21 Feb. 2013; which application and publication are incorporated herein by reference in their entirety.

BACKGROUND

Understanding the structure and properties of geological formations can reduce the cost of drilling wells for oil and gas exploration. Measurements made in a borehole (i.e., down hole measurements) are typically performed to attain this understanding, to identify the composition, structure, properties, and distribution of material that surrounds the measurement device down hole. To obtain such measurements, logging tools of the acoustic type are often used to provide information that is directly related to geo-mechanical properties.

Traditional acoustic tools utilize transmitters to create pressure waves inside the borehole fluid, which in turn create several types of waveguide modes in the borehole. These modes can be processed to determine formation properties, such as compression and shear wave velocity of the formation. Traditional tools use electrically excited (i.e., active) sources to produce movement in the formation. To support broad-band operation and overcome noise, transmitters often have a high power requirement. As a result, large capacitor sections are located in the tool, with a significant increase in tool length. Moreover, mechanical and electrical design of the transmitters is usually difficult, increasing the tool manufacturing and maintenance costs considerably.

DETAILED DESCRIPTION

To address some of the challenges described above, as well as others, apparatus, systems, and methods for making passive borehole acoustic measurements are described. Noise is produced passively, during logging or drilling activities, without a separate, active transmitter. This mechanism permits accurate determination of formation properties; the information developed can also be used to estimate and calibrate receiver gains.

Several advantages may accrue. For example, energy requirements down hole may be reduced, with faster logging speeds, increased lateral resolution, and lower frequency operation. The tool design may be simplified, since a separate transmitter and associated electronics (e.g., capacitor section) are not needed. Wide frequency dispersion curves for measured modes are provided, with the noise serving as a stable reference for receiver gain estimation and calibration. Finally, this approach can sometimes be implemented with minor, rather than major changes to existing hardware and software.

Figure 1:
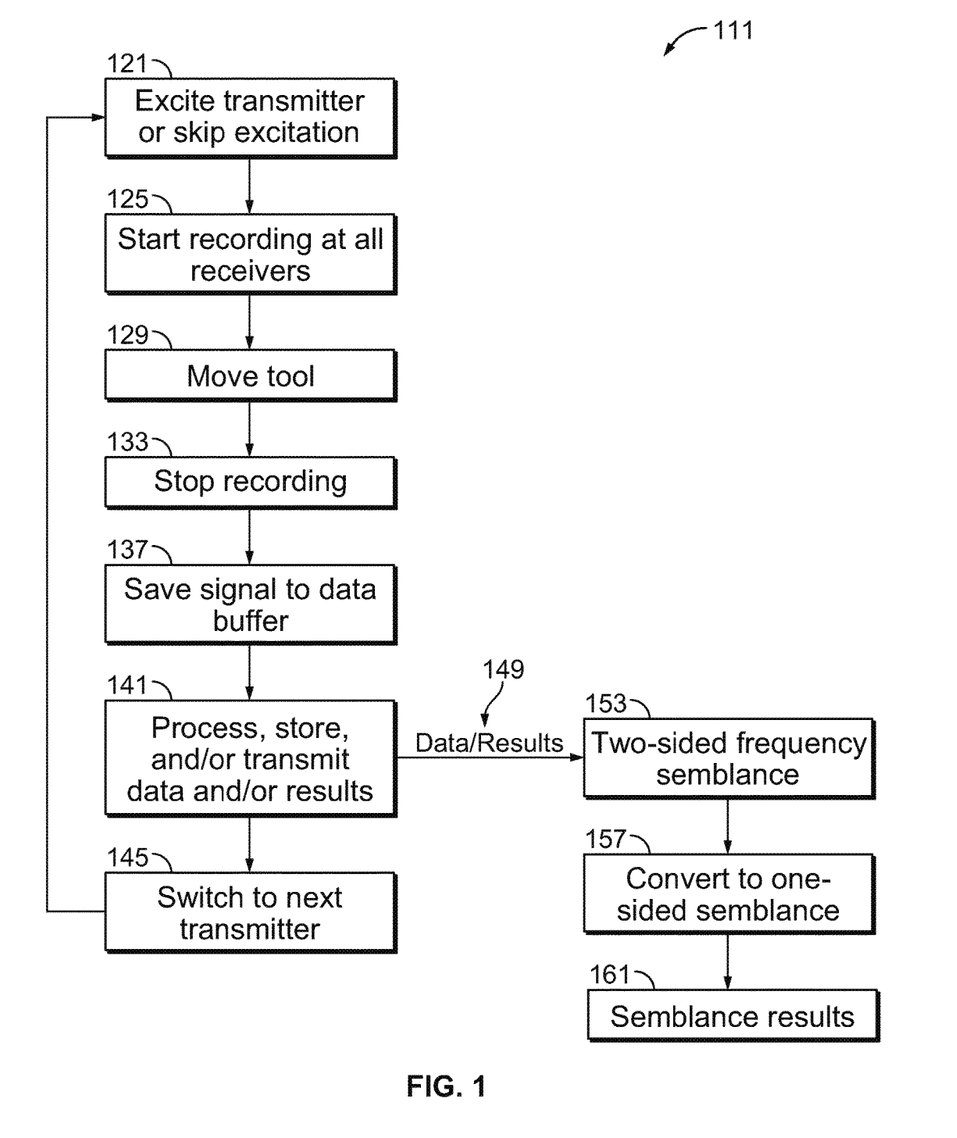
FIG. 1 is a flow chart illustrating several methods according to various embodiments of the invention.

FIG. 1 is a flow chart illustrating several methods 111 according to various embodiments of the invention. In some embodiments, conventional transmitters are excited at block 121 (this activity may also be skipped, since noise provided by tool movement within the borehole will be present in every case). Thereafter, recording begins at block 125. The tool is moved along the length of the borehole at block 129, and the received noise data generated by tool movement is recorded. The recording can be halted at block 133, and the acquired signal data can be stored in a buffer at block 137. Of course, the order of activities in blocks 125, 129, 133, and 137 can be interchanged, and individual acts can be repeated as desired.

The acquired data can be processed, stored, and/or transmitted to the surface at block 141. If down hole processing is desired, the processed results 149 may be stored and transmitted elsewhere, with or without data 149. In any case, processing may include scaling, filtering, re-sampling, and clamping (limiting).

If one or more conventional transmitters are used, pulse excitation may be applied to a different conventional (active) source at block 145, and the procedure described is repeated by returning to block 121.

The sampling rate for recording should be adjusted according to the Nyquist criterion, and is a function of the highest recorded frequency. Recording time is a function of the lowest recorded frequency. In practice, the listening time is usually relatively small compared to the total logging time, and each recorded sample comprises a relatively short windowed portion of the available noise. Tapering (using a multiplication window for the acquired signal that forces the signal magnitude near the beginning and end of the window to zero) may be used in analyzing the acquired data in the frequency domain.

In many embodiments, time and frequency semblance methods can be used to analyze the acquired noise data with minor modifications. However, an exception is the estimation of arrival time by detecting the first peak in the time signal. Since the signal due to noise does not have a conventional beginning (i.e., it starts with tool movement, which does not serve to mark the signal initiation in the same way as the well-defined pulse provided by a conventional transmitter), the peak that is present may not be very well defined. Thus, peak detection may not be used as effectively as it is for a signal received from a traditional source (e.g., one with a separate, active transmitter).

Time semblance methods can be applied in traditional ways, although a conventional time-slowness window (e.g., a fan, which is a two-dimensional window in time-slowness plots that reduces or eliminates noise) may be less useful in some embodiments.

Frequency semblance methods can also be applied in traditional ways, allowing for positive and negative slowness values simultaneously. That is, whereas conventional time semblance methods look at only positive slowness values (e.g., waves travelling from the transmitter to the receiver, and not in the reverse direction), in many embodiments positive and negative slowness values may be present. This is because noise can propagate simultaneously in the forward and backward directions (e.g., sources of noise can be located on both sides of a receiver, producing positive and negative slowness values). After reading this disclosure, those of ordinary skill in the art will realize that processing the negative slowness values is a straightforward extension to the existing algorithm—so this will not be described in detail here.

Two-sided (positive and negative) frequency semblance results can be converted to one-sided results for visualization purposes by taking the absolute value of the negative slowness values. Time and frequency data or products from multiple recordings can be stacked (e.g., by making multiple measurements with the same acquisition arrangement, and averaging the results), as is known to those of ordinary skill in the art, to reduce or eliminate noise in the signal processing results.

The primary source of energy used in the measurements described herein is the noise produced when the tool moves in the borehole. Sources that produce this noise include calipers, centralizers, and other elements forming part of the tool (including another tool in the string) that rub or scratch against the wall of the borehole. The movement of the tool against fluid in the borehole (e.g., the sloshing noise produced by the fluid moving against the sides of the tool and the borehole) may also form part of this primary energy source.

The primary source of energy may be augmented by a secondary source of energy in some embodiments. For example, additional noise may be generated by external sources, including surface operations. In logging while drilling (LWD) or measurement while drilling (MWD) applications, the drill bit may also serve as a secondary source of energy.

In order to amplify the noise provided by the primary source, calipers, centralizers, and other parts of the tool string can be modified. For example, the axial cross-section of parts of the tool can be increased to boost fluid sloshing noise. The pressure applied by the caliper and centralizer on the borehole wall can also be increased to amplify scratching noise. It is also possible to include shapes or cavities in the tool structure and its attachments that produce resonant (e.g., whistling) modes. All of these modifications can be made symmetrically to produce monopole modes, and/or asymmetrically to produce dipole modes.

Since noise often increases with logging speed, greater logging speeds can often be used to increase noise power. As a result, noise characteristics can be used to measure logging speed, or to determine caliper/centralizer characteristics. For example, the speed of movement should change the amplitude of the noise, so that greater noise amplitude might indicate a faster logging speed. An abrupt increase in amplitude without a change in logging speed might indicate that a caliper has been opened, whereas an abrupt decrease in amplitude under the same conditions might indicate the caliper has been closed.

Receivers are often manufactured with similar properties, and kept in similar conditions to better match gain properties as the components age. However, adjustments are sometimes needed when a useful match between receiver units is no longer possible. In many embodiments, acquired noise data can be used to evaluate and calibrate receiver gain.

In order to assess receiver quality, receiver gains are calculated, usually in a borehole or in an external enclosure—with noise operating as a relatively constant receiver matching source. In some embodiments, signal amplitude or signal root-mean-square averaged amplitude in a depth range of interest can be used as a measure of signal gain. Receivers that have reduced gain, but are otherwise stable, can be calibrated by applying a multiplicative correction factor. Additional embodiments may be realized.

Figure 2:
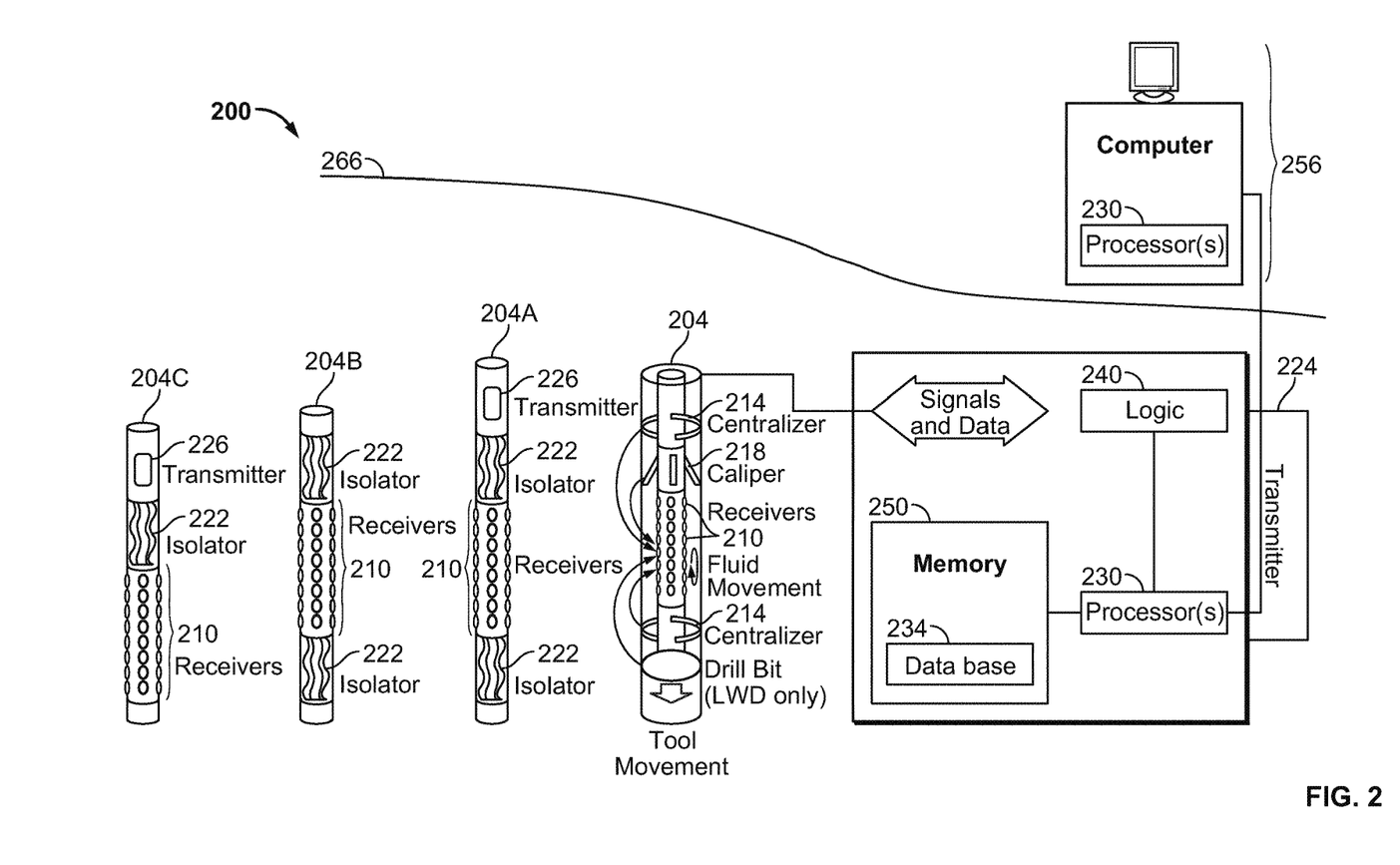
FIG. 2 is a block diagram of apparatus according to various embodiments of the invention.

For example, FIG. 2 is a block diagram of apparatus 200 according to various embodiments of the invention. In many embodiments, the apparatus 200 comprises a combination of one or more down hole receivers 210, and one or more processors 230. Either one of the receivers 210 and/or the processors 230 may be located inside or outside the tool body 204 (perhaps attached to the outside of the tool body 204, or not).

The apparatus 200 may also include logic 240, perhaps comprising a programmable drive and/or sampling control system. The logic 240 can be used to acquire noise data, and other data, such as resistivity information.

A memory 250, located inside or outside the tool body 204, can be used to store acquired noise data, and/or processing results (e.g., perhaps in a database 234). The memory 250 is communicatively coupled to the processor(s) 230. While not shown in FIG. 2, it should be noted that the memory 250 may be located down hole, or above the surface of the formations 266.

Thus, some embodiments include an apparatus 200 comprising at least one receiver 210 to acquire acoustic noise data, and at least one processor 230. The processor 230 may operate to process the acoustic noise data to determine calibration parameters of the receivers 210, or properties of the surrounding formation 266. The acoustic noise data is provided by a primary, passive source of noise energy comprising a down hole tool body 204 moving within a borehole, and/or a positioning device 214 or a measurement device 218 attached to the tool body 204. The positioning device 214 may comprise one or more centralizers. The measurement device 218 may comprise one or more calipers.

A data transmitter may be used to transmit the data and/or processing results to the surface. Thus, the apparatus 200 may comprise a data transmitter 244 (e.g., a telemetry transmitter) to transmit the acoustic noise data to a surface data processing system 256.

One or more acoustic noise isolators can be attached to the tool body. Thus, the apparatus 200 may comprise at least one acoustic noise isolator 222 attached to the tool body 204, proximate to the receivers 210.

The structure of the tool body may be configured symmetrically, or asymmetrically, to excite dipole modes. Thus, the primary, passive source of noise energy may comprise the positioning device 214 or the measurement device 218 configured as an asymmetrical device to excite resonant dipole modes.

Three embodiments of the tool body 204 are shown in FIG. 2. Tool bodies 204A, 204B, and 204C illustrate different configurations of receivers 210, noise isolators 222, and separate transmitters 226 (that serve as secondary sources of energy).

In many embodiments, an array of receivers 210 is used to measure formation properties. Receivers 210 located in an axial direction along the tool body 204 can be used to make slowness measurements. Receivers 210 located in an azimuthal direction around the tool body 204 can be used to make azimuthally-sensitive measurements, such as a dipole measurement.

In some embodiments, a conventional, active transmitter 226 is used as an additional source of energy, complementing the primary and secondary sources. For example, certain modes that are not properly excited by acoustic noise can be excited by the transmitter 226.

One or more isolator sections 222 may be attached to the tool body 204. The isolator sections 222 may comprise material (well known to those of ordinary skill in the art) that elongates the wave travel path to absorb tool mode energy, reducing tool modes, and thus, the resulting contamination of noise measurement. Multiple isolator sections 222 may be used to effectively reduce tool mode noise when the noise propagates in more than one direction.

Some of the potential advantages provided by various embodiments described briefly above will now be explained in more detail.

Energy Efficiency, Faster Logging Speeds, Better Lateral Resolution, and Low Frequency Operation.

Traditional down hole tools often operate to deliver large amounts of energy in a short amount of time. This translates to a relatively high power requirement. However, all tools in the down hole string have limited power available, so that charging cycles may be used when lots of power is required.

Many of the embodiments that use the primary source of energy described herein do not make use of charging cycles. As a result, a greater number of samples can be collected in a given time, which means faster logging speeds and/or better lateral resolution. Since noise power generally increases with logging speed, higher speeds are also favorable to increasing the amplitude and quality of the acquired data. The use of a passive energy source as the primary source (in place of an active source) reduces the overall power consumption of the tool.

In addition, most traditional (separate, active) transmitter designs operate to move the face of a powered transducer to create pressure waves in the borehole. Since there is only limited space available for movement, in general, transmitters are limited in the power that can be delivered, especially at low frequencies. The piezoelectric material design used in the transducers of most acoustic tools also has a resonant frequency, above and below which it is difficult to excite. As a result, the magnitude of transmitter frequency response drops significantly at very low frequencies.

Noise, on the other hand, behaves quite differently. That is, noise peaks at a relatively low frequency. Thus, noise may improve low frequency response when compared to using a traditional source, so that logging of slower formations can be conducted more effectively.

Simplified tool design. Tools can be fabricated without a conventional transmitter as a source of energy, obviating the use of associated electronics, including a capacitor section. A significant reduction in tool length can often be realized.

Increased Measurement Accuracy.

Experimental modeling, using an analytical code in the same well at similar depths, was used to compare traditional transmitter frequency semblance results, and those obtained when the primary source of energy was a passive source of noise. The tool included 32 receivers, arranged in eight stations—each station comprising four receivers A, B, C, D spaced approximately 90° apart. High-frequency monopole firing (M), dipole firing (X), and low frequency monopole firing (M2) were simulated.

In monopole firing, all azimuthal receivers are summed (A+B+C+D), and in dipole firing, receivers aligned with the associated dipole transmitter are subtracted (e.g., A−C). An embodiment similar to that shown for tool body 204C (in FIG. 2) was used. The end result was that the simulated inventive embodiment successfully recorded the presence of Stoneley, flexural, and refracted shear waves. The quality of the curves was not quite as good as those obtained with conventional transmitter use. However, improvement was obtained by: increasing noise amplitude (e.g., by opening the caliper or adding force to the caliper extension), and stacking semblance results.

Wideband Frequency Dispersion Curves for Measured Modes.

The simulation results also indicated that Stoneley mode curves identified in a frequency semblance could be expected to extend from approximately 0-12 KHz, with the flexural mode extending from approximately 5-10 KHz. These curves can be used to apply frequency dispersion correction, and to identify formation properties, such as compression and shear wave velocities. Frequency semblance curves are also useful to predict geo-mechanical properties of the formation. While the active source transmitter generally provides a more concentrated signal, it is attended by the drawbacks noted earlier.

Receiver Gain Estimation and Calibration.

Some conventional processing algorithms assume all transmitters and receivers have known or identical characteristics. However under downhole conditions, acoustic transmitter and receiver characteristics may change significantly and unpredictably with pressure and temperature. Therefore it is useful to make in-situ measurements of receiver characteristics to compensate for these variations. For example, it has been observed as part of the modeling exercise that low frequency portion of the noise provided by various embodiments can serve as a relatively stable reference for the estimation and calibration of at least one of these characteristics: receiver gain. The process that follows illustrates how receiver gain can be estimated from a noise signal:

1. calculate the ratios of individual receiver gain to the average gain of all receivers: $g_i = V_i/[\text{sum of all receiver voltages}/N]$ 2. apply an attenuation correction factor to each ratio: $g_i^C = \gamma_i * g_i$ 3. convert the ratios to a log scale: $g_i^1 = \log(g_i^C)$ 4. apply a depth filter to each ratio: $g_i^f = g_i^1 * f = df$ 5. convert the ratios back to a linear scale to get estimated receiver gain: $g_i^n = e^{df}$ 6. calculate the deviation in estimated gain as a percentage: $p_i = 100 * (g_i^n - 1)$.

Here, $V_i$ denotes the voltage at receiver i, taken over a number N of receivers. Gain is calculated with respect to the average of all receivers by computing the ratio of individual receiver gains to the average gain of all receivers.

A set of correction factors is applied to the gains to remove the effect of signal attenuation from the first to the last receiver. Correction factor values $\gamma_i$ may range from about 0.97 to 1.03, and are tool-dependent. The range in values $\gamma_i$ could be much wider, as this factor provides compensation due to the geometry of the physical receiver location on the tool. Those of ordinary skill in the art know that the correction factor values $\gamma_i$ can be calculated by modeling and/or analytical formulas.

The moving average filter factor f is applied to the ratios on a logarithmic scale, before conversion back to a linear scale. The depth of the filter f depends on the resolution desired in the gain estimation. A window that is too long may not provide enough resolution over depth. In some embodiments, a filter depth of approximately 30 meters is used. The deviation is calculated as a percentage, based on deviation of the ratio from a value of 1.0.

In practice, receivers may show a 20% deviation in gain, or more. The baseline trend of receiver gain variation using noise as a source, compared to a conventional transmitter, is similar, although the noise result shows more variation with respect to depth.

Another approach can be used to estimate receiver gains. In this case, the root-mean-square of the filtered time signal (where the received signal is filtered in the time domain—before entering the estimation process) at each receiver i is used in the place of $V_i$ from the previous process. When a low-pass filter with a 500 Hz cut-off was used, similar results were obtained in the comparison.

Figure 3A:
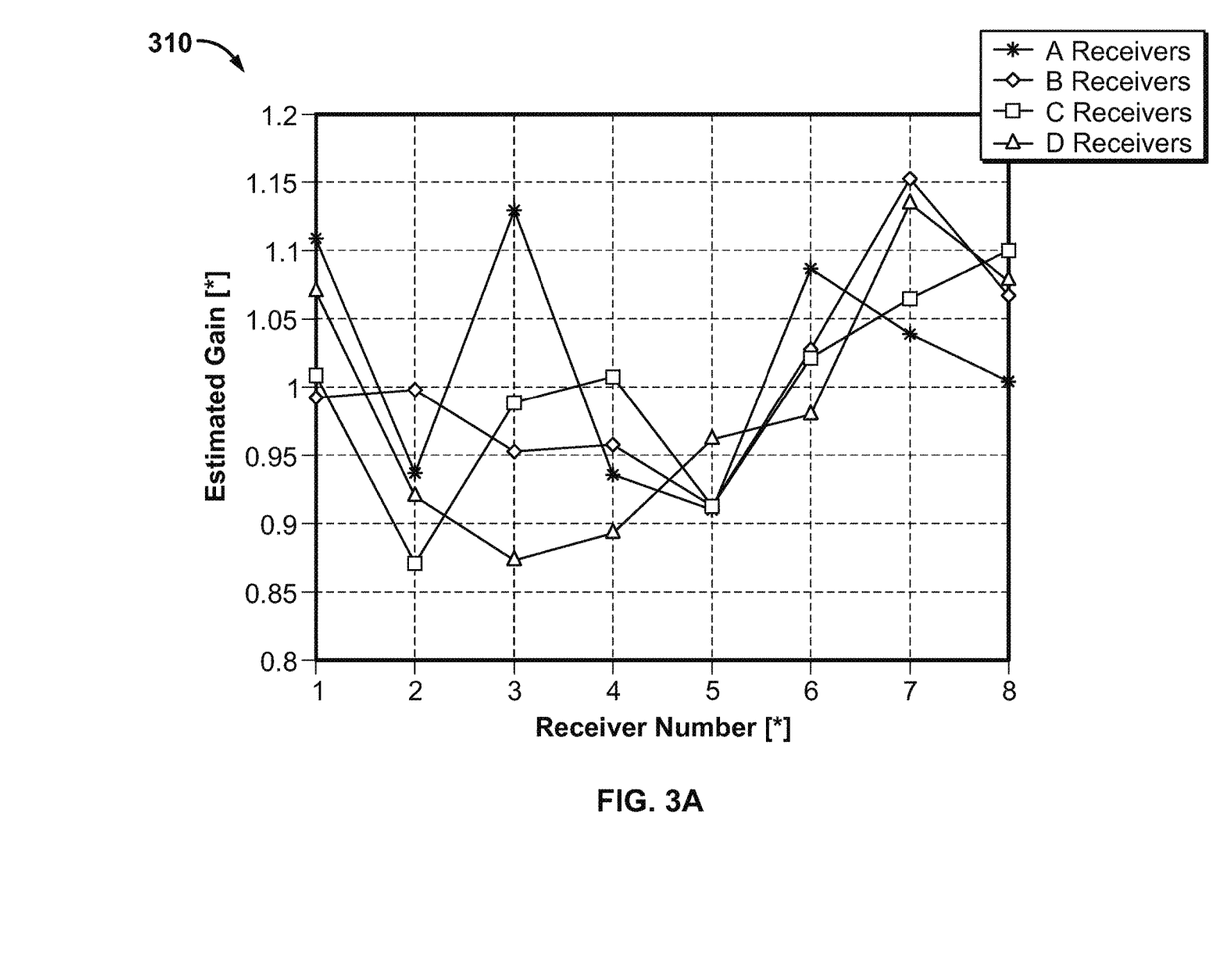
FIG. 3 illustrates estimated receiver gain coefficients, derived according to various embodiments of the invention.
Figure 3B:
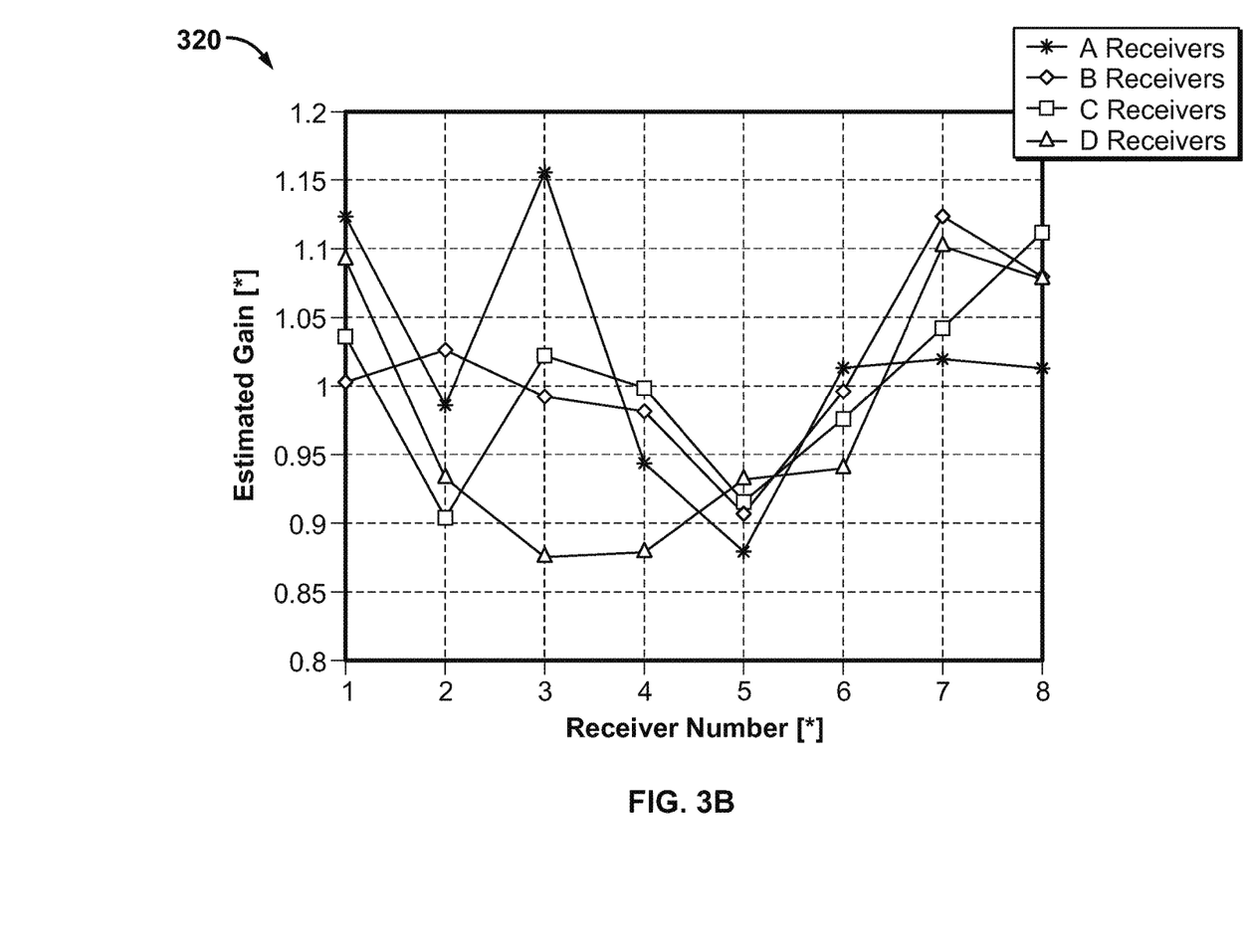
Figure 3C:
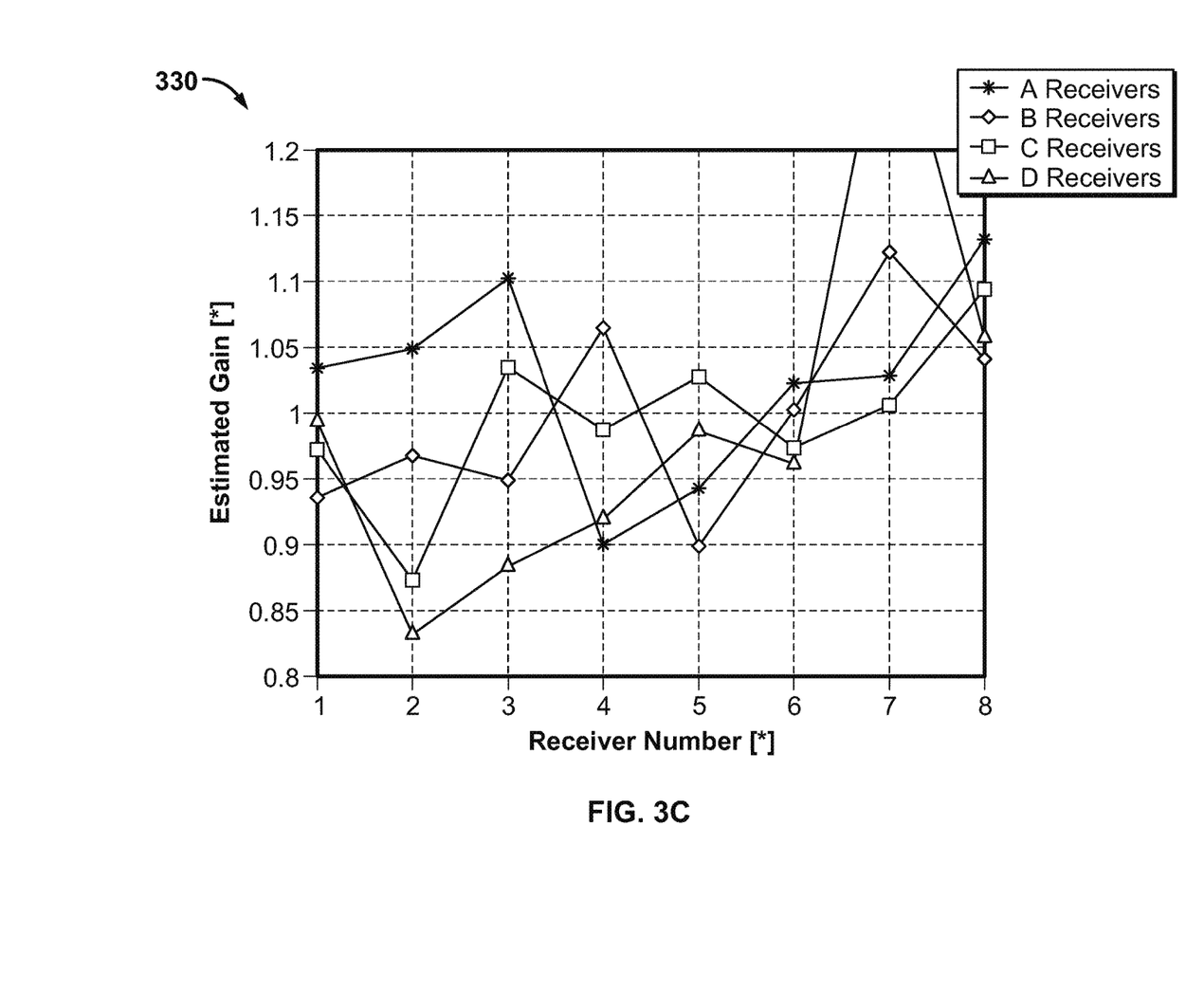

FIG. 3 illustrates estimated receiver gain coefficients, derived according to various embodiments of the invention. The graphs 310, 320, 330 illustrate frequency and time-based gain coefficients that are obtained by taking the average of each reception curve along the depth dimension (as occurs when the process described above is used), producing curves of estimated receiver gain. These are shown for the transmitter (graph 310), the noise (graph 320), and the noise as a time-based calculation (graph 330). These coefficients can be applied as described above to correct for the variations in receiver gain.

These coefficients can be applied as a dynamic gain calibration adjustment to compensate for drift as a first part of the calibration process. As a second part of the process, an average along the curve over a range of depths can be taken to get a single number that is used as a static calibration coefficient—which can be used prospectively, in future measurements.

The measurements to derive gain coefficients can be made in a relatively uniform casing section, or in some selected section of a well. A static calibration obtained from this process can be used to log the rest of the well (e.g., the open section). Dynamic calibration can also be used, but sometimes produces undesirable results, because gain can be affected by local formation variations. The receivers can be calibrated by applying the inverse of the gain coefficients to the data. Thus, additional embodiments may be realized.

Figure 4:
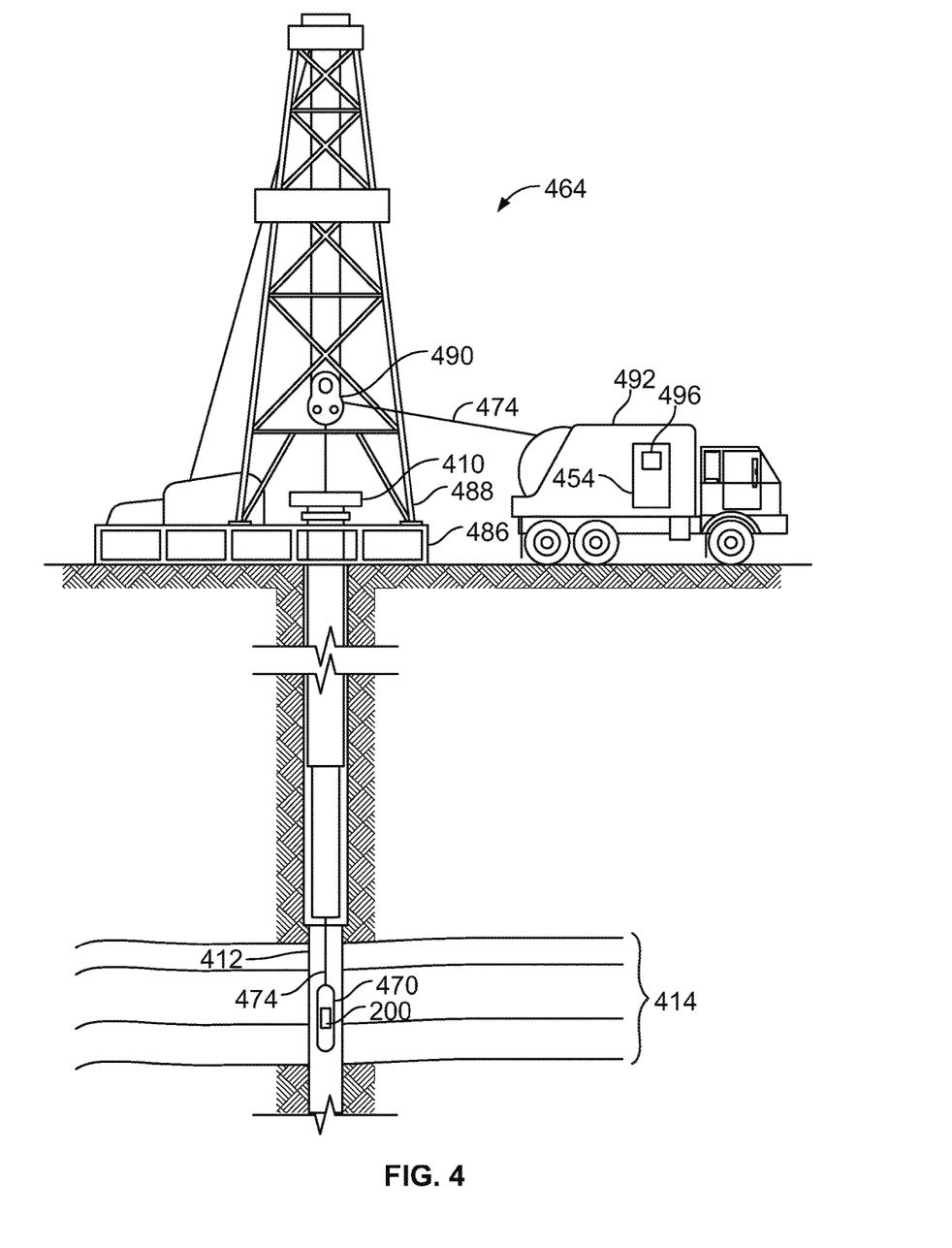
FIG. 4 illustrates a wireline system embodiment of the invention.
Figure 5:
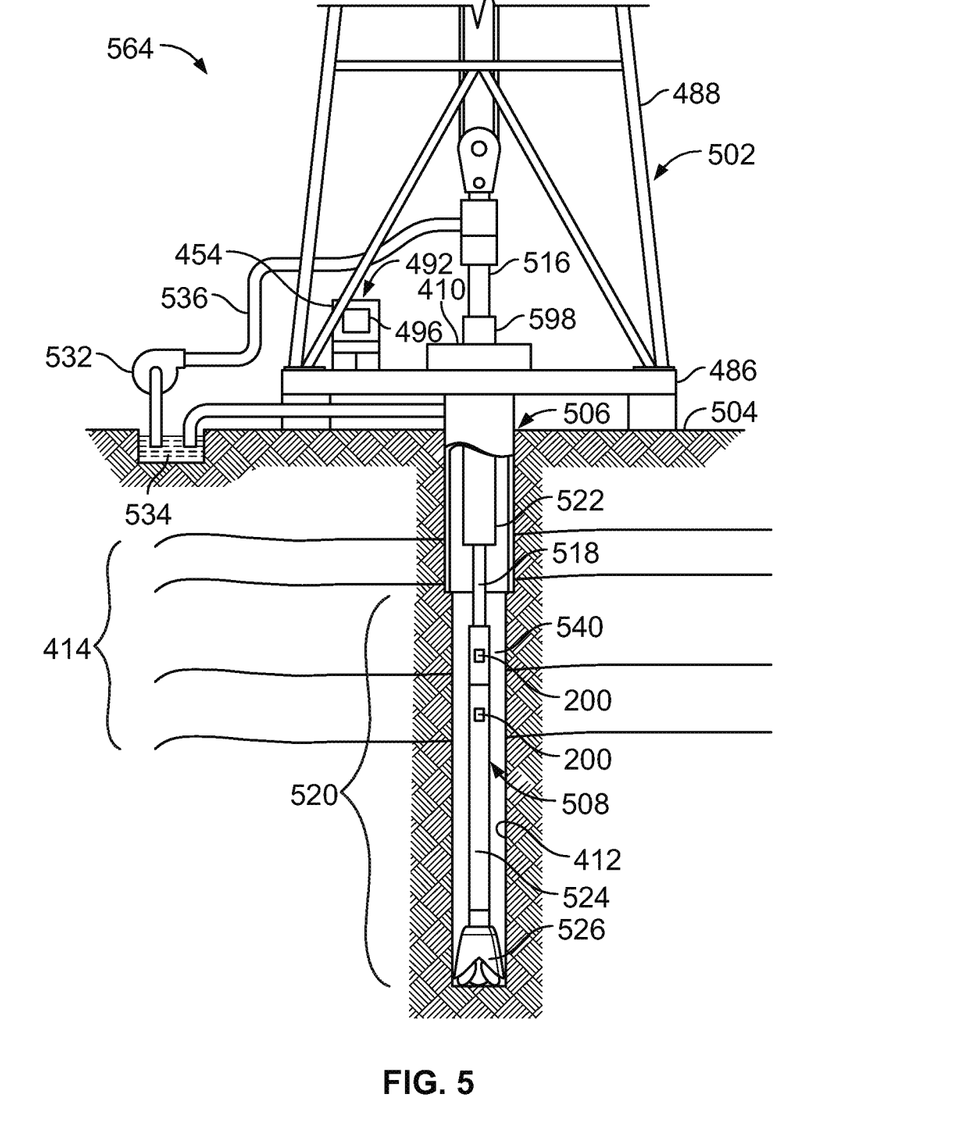
FIG. 5 illustrates a drilling rig system embodiment of the invention.

FIG. 4 illustrates a wireline system 464 embodiment of the invention, and FIG. 5 illustrates a drilling rig system 564 embodiment of the invention. Thus, the systems 464, 564 may comprise portions of a wireline logging tool body 470 as part of a wireline logging operation, or of a down hole tool 524 as part of a down hole drilling operation. FIG. 4 shows a well during wireline logging operations. A drilling platform 486 is equipped with a derrick 488 that supports a hoist 490.

Drilling of oil and gas wells is commonly carried out using a string of drill pipes connected together so as to form a drilling string that is lowered through a rotary table 410 into a wellbore or borehole 412. Here it is assumed that the drilling string has been temporarily removed from the borehole 412 to allow a wireline logging tool body 470, such as a probe or sonde, to be lowered by wireline or logging cable 474 into the borehole 412. Typically, the wireline logging tool body 470 is lowered to the bottom of the region of interest and subsequently pulled upward at a substantially constant speed.

During the upward trip, at a series of depths the instruments (e.g., the receivers 210 shown in FIG. 2) included in the tool body 470 may be used to perform measurements on the subsurface geological formations 414 adjacent the borehole 412 (and the tool body 470). The measurement data can be communicated to a surface logging facility 492 for storage, processing, and analysis. The logging facility 492 may be provided with electronic equipment for various types of signal processing, which may be implemented by any one or more of the components of the apparatus 200 in FIG. 2.

Similar formation evaluation data may be gathered and analyzed during drilling operations (e.g., during LWD operations, and by extension, sampling while drilling).

In some embodiments, the tool body 470 comprises an acoustic tool for obtaining and analyzing acoustic noise measurements from a subterranean formation through a wellbore. The tool is suspended in the wellbore by a wireline cable 474 that connects the tool to a surface control unit (e.g., comprising a workstation 454). The tool may be deployed in the wellbore on coiled tubing, jointed drill pipe, hard wired drill pipe, or any other suitable deployment technique.

Turning now to FIG. 5, it can be seen how a system 564 may also form a portion of a drilling rig 502 located at the surface 504 of a well 506. The drilling rig 502 may provide support for a drill string 508. The drill string 508 may operate to penetrate a rotary table 410 for drilling a borehole 412 through subsurface formations 414. The drill string 508 may include a Kelly 516, drill pipe 518, and a bottom hole assembly 520, perhaps located at the lower portion of the drill pipe 518.

The bottom hole assembly 520 may include drill collars 522, a down hole tool 524, and a drill bit 526. The drill bit 526 may operate to create a borehole 412 by penetrating the surface 504 and subsurface formations 414. The down hole tool 524 may comprise any of a number of different types of tools including MWD tools, LWD tools, and others.

During drilling operations, the drill string 508 (perhaps including the Kelly 516, the drill pipe 518, and the bottom hole assembly 520) may be rotated by the rotary table 410. In addition to, or alternatively, the bottom hole assembly 520 may also be rotated by a motor (e.g., a mud motor) that is located down hole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 404 and subsurface formations 414.

During drilling operations, a mud pump 532 may pump drilling fluid (sometimes known by those of ordinary skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 412. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation 414 cuttings created by operating the drill bit 526.

Thus, referring now to FIGS. 2 and 4-5, it may be seen that in some embodiments, the systems 464, 564 may include a drill collar 522, a down hole tool 524, and/or a wireline logging tool body 470 to house one or more apparatus 200, similar to or identical to the apparatus 200 described above and illustrated in FIG. 2. Thus, for the purposes of this document, the term "housing" may include any one or more of a drill collar 522, a down hole tool 524, or a wireline logging tool body 470 (all having an outer wall, to enclose or attach to instrumentation, sensors, fluid sampling devices, pressure measurement devices, transmitters, receivers, acquisition and processing logic, and data acquisition systems). The tool 524 may comprise a down hole tool, such as an LWD tool or MWD tool. The wireline tool body 470 may comprise a wireline logging tool, including a probe or sonde, for example, coupled to a logging cable 474. Many embodiments may thus be realized.

For example, in some embodiments, a system 464, 564 may include a display 496 to present acoustic noise information, both measured and processed/calculated, as well as database information, perhaps in graphic form. A system 464, 564 may also include computation logic, perhaps as part of a surface logging facility 492, or a computer workstation 454, to receive signals from transmitters and receivers, and other instrumentation to determine properties of the formation 414.

Thus, a system 464, 564 may comprise a down hole tool body, such as a wireline logging tool body 470 or a down hole tool 524 (e.g., an LWD or MWD tool body), and an apparatus 200 attached to the tool body, the apparatus 200 to be constructed and operated as described previously.

The apparatus 200; tool body 204; receivers 210; positioning devices 214; measurement devices 218; separate, active transmitters 226; processors 230; database 234; logic 240; data transmitter 244; data processing system 256; rotary table 410; borehole 412; computer workstations 454; systems 464, 564; wireline logging tool body 470; logging cable 474; drilling platform 486; derrick 488; hoist 490; logging facility 492; display 496; drill string 508; Kelly 516; drill pipe 518; bottom hole assembly 520; drill collars 522; down hole tool 524; drill bit 526; mud pump 532; mud pit 534; and hose 536 may all be characterized as "modules" herein. Such modules may include hardware circuitry, and/or a processor and/or memory circuits, software program modules and objects, and/or firmware, and combinations thereof, as desired by the architect of the apparatus 200 and systems 464, 564 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 200 and systems 464, 564 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

Figure 6:
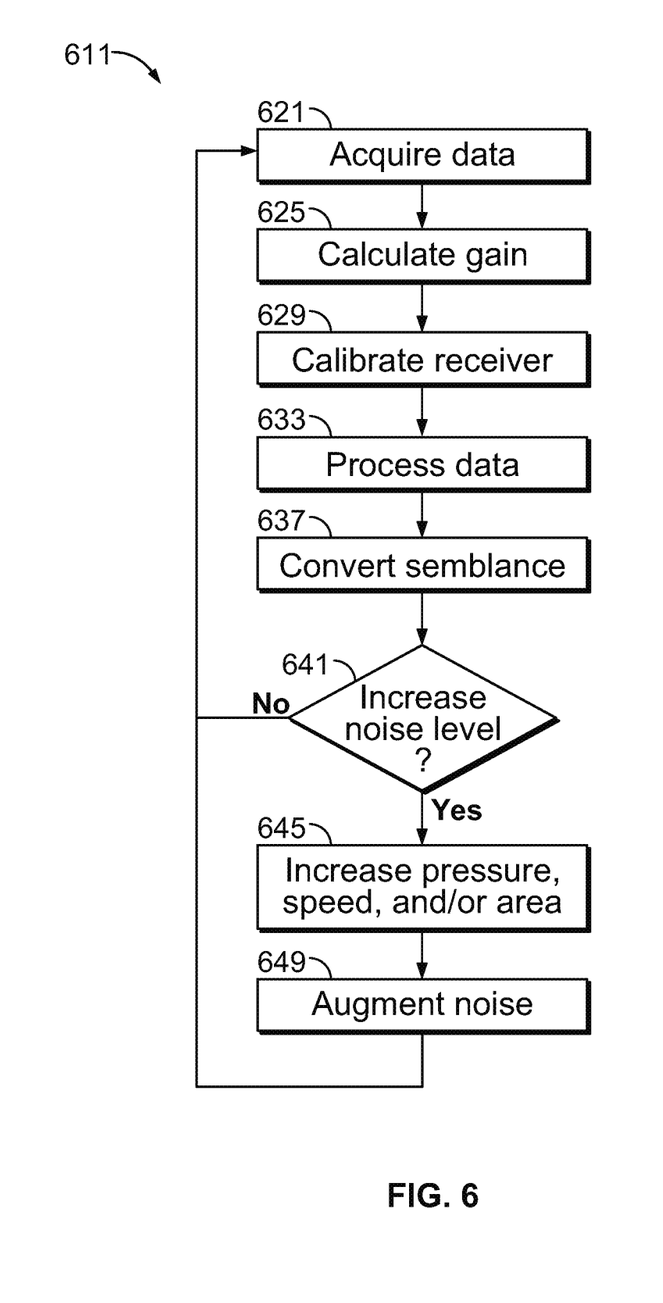
FIG. 6 is a flow chart illustrating several additional methods according to various embodiments of the invention.

For example, FIG. 6 is a flow chart illustrating several additional methods 611 according to various embodiments of the invention. The methods 611 may comprise process-implemented methods, and may include, in more basic formats, acquiring acoustic noise data generated by a primary, passive source of energy, and processing the data to determine receiver calibration parameters or formation properties, or both.

In some embodiments, the methods 611 may begin at block 621 with acquiring acoustic noise data by at least one receiver, the acoustic noise provided by a passive source comprising a down hole tool body moving within a borehole. The passive source may alternatively, or in addition, comprise a positioning device or a measurement device attached to the tool body.

For the purposes of this document, it should be understood that none of the items comprising the passive source (down hole tool body, positioning device, or measurement device) include a drill bit, or any similar device that is normally used to actively contact the surface of the formation so as to penetrate the formation and purposely increase the depth or diameter of the borehole to a substantial degree. Similarly, active noise sources which receive power to transmit acoustic noise into the formation, such as transducers, are not included as part of the passive source.

The acoustic noise data can be acquired from two directions at the same time. Thus, the activity at block 621 may comprise simultaneously acquiring the acoustic noise data from a first direction along the tool body and from a second direction along the tool body, the second direction being substantially opposite the first direction.

Symmetrical devices can be used to excite resonant monopole modes. Thus, the activity at block 621 may comprise acquiring the acoustic noise data from movement of the positioning device or the measurement device configured as a symmetrical device to excite resonant monopole modes.

Receiver gains can be calculated with, or without calibration, as described previously. Thus, in some embodiments, the method 611 may continue on to block 625 to include calculating gain for one or more of the receivers without using calibration parameters.

In some embodiments, the calculated receiver gain can be calibrated (e.g., for gain correction after calculation) by applying static or dynamic gain correction parameters. Calibration factors can be applied to the receiver itself, an amplifier coupled to the receiver, or to the acoustic noise data, after acquisition. Thus, the method 611 may continue on to block 629 to include calibrating one or more receivers by applying static gain correction parameter (e.g., corresponding to the acoustic noise data obtained over a cased distance of the borehole), and/or dynamic gain correction parameters (e.g., corresponding to the acoustic noise data obtained over an uncased distance of the borehole, as measurements are made). The acoustic noise data may thus be processed at block 629 to determine calibration parameters, and perhaps apply them to one or more receivers.

Variations are possible. For example, gains may be calculated using the noise source and applied to transmitter source data. In this case the noise source is used to calibrate the source of the noise transmission.

Calibration parameters (e.g., a gain coefficient or deviation in receiver gain) can also be determined by estimating the receiver gain. Thus, determining calibration parameters may comprise estimating the gain of the at least one receiver.

The method 611 may continue on to block 633 to include processing the acoustic noise data to determine formation properties, to include calculating compression or shear wave slowness. The act of calibrating receivers at block 629 may serve to enhance the accuracy of the processing at block 633. This is especially useful in the case of dipole receivers, where two receiver poles composing the dipole can be calibrated to have similar amounts of gain.

Processing may incorporate time/frequency semblance methods. Thus, the activity at block 633 may comprise applying a time semblance method or a frequency semblance method to the acoustic noise data to determine one or more formation properties.

The acoustic noise data can be filtered to provide results with greater stability, while maintaining the desired resolution. Thus, the activity at block 633 may comprise applying a depth filter to the acoustic noise data after correction of the acoustic noise data for attenuation by one or more receivers.

Some embodiments provide two-sided frequency semblance data, which can be converted to one-sided data. For example, two-sided semblance data may be converted to one-sided semblance data for publication purposes, to make visualization easier. For transmitter source data, this activity may be obviated, since the semblance data may be received as one-sided data. Thus, the method 611 may continue on to block 637, to include converting two-sided frequency semblance data to one-sided frequency semblance data, perhaps using an absolute value of negative slowness values.

In some embodiments, it is desirable to increase the level of noise that is acquired. If that is not the case, the method 611 may return to block 621. If it is the case, this can be accomplished in several ways.

For example, at block 645, devices attached to the down hole tool can be manipulated to increase the magnitude of the acoustic noise that is generated by the primary source, such as by increasing pressure between the device and the borehole wall. Thus, the activity at block 645 may comprise increasing azimuthal pressure applied to the borehole wall by the positioning device or the measurement device, to increase the amplitude of the measured acoustic noise data.

In some cases, logging speed can be increased to amplify acoustic noise magnitude. Thus, the activity at block 645 may include increasing logging speed of the down hole tool within the borehole to increase the amplitude of the acoustic noise data.

Down hole component cross-sectional area can also be increased to amplify acoustic noise magnitude, via fluid interference, in some cases. Thus, the activity at block 645 may comprise increasing the cross-sectional area of the down hole tool, the positioning device, and/or the measurement device within the borehole to increase the amplitude of the acoustic noise data.

The noise provided by the primary source may be augmented by a secondary energy source. Thus, a drill bit can be used to provide additional acoustic noise data. Therefore, the methods 611 may include, at block 649, augmenting the acoustic noise data with drill bit noise data during a drilling operation. The methods 611 may then return to block 621 in some embodiments.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIGS. 1 and 6) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C#. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 7:
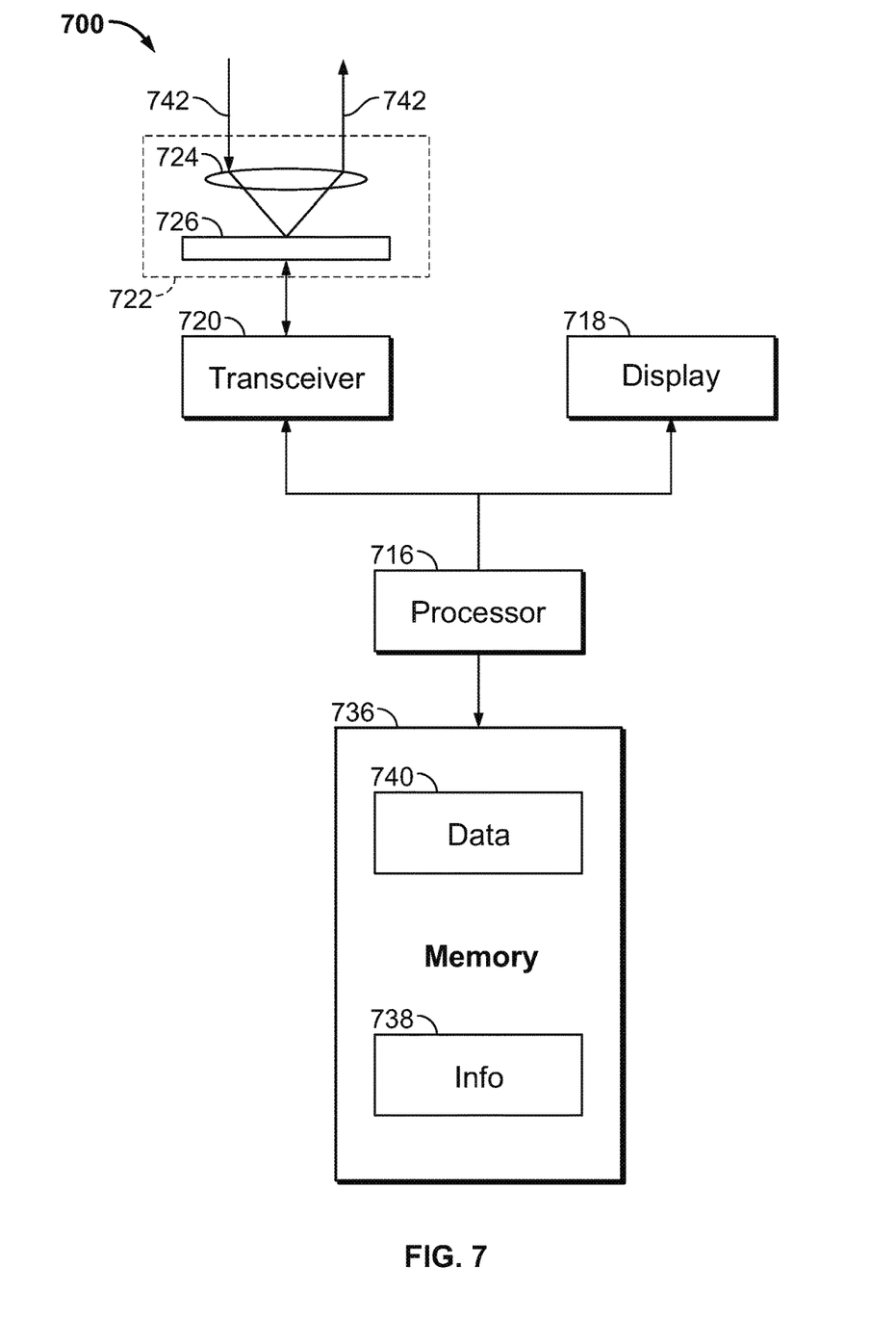
FIG. 7 is a block diagram of an article according to various embodiments of the invention.

For example, FIG. 7 is a block diagram of an article 700 of manufacture according to various embodiments, such as a computer, a memory system, a magnetic or optical disk, or some other storage device. The article 700 may include one or more processors 716 coupled to a machine-accessible medium such as a memory 736 (e.g., removable storage media, as well as any tangible, non-transitory memory including an electrical, optical, or electromagnetic conductor) having associated information 738 (e.g., computer program instructions and/or data), which when executed by one or more of the processors 716, results in a machine (e.g., the article 700) performing any actions described with respect to the methods of FIGS. 1 and 6, the apparatus of FIG. 2, and the systems of FIGS. 4 and 5. The processors 716 may comprise one or more processors sold by Intel Corporation (e.g., Intel® Core™ processor family), Advanced Micro Devices (e.g., AMD Athlon™|AMD Athlon processors), and other semiconductor manufacturers.

In some embodiments, the article 700 may comprise one or more processors 716 coupled to a display 718 to display data processed by the processor 716 and/or a wireless transceiver 720 (e.g., a down hole telemetry transceiver) to receive and transmit data processed by the processor.

The memory system(s) included in the article 700 may include memory 736 comprising volatile memory (e.g., dynamic random access memory) and/or non-volatile memory. The memory 736 may be used to store data 740 processed by the processor 716.

In various embodiments, the article 700 may comprise communication apparatus 722, which may in turn include amplifiers 726 (e.g., preamplifiers or power amplifiers) and one or more antenna 724 (e.g., transmitting antennas and/or receiving antennas). Signals 742 received or transmitted by the communication apparatus 722 may be processed according to the methods described herein.

Many variations of the article 700 are possible. For example, in various embodiments, the article 700 may comprise a down hole tool, including the tool apparatus 200 shown in FIG. 2. In some embodiments, the article 700 is similar to or identical to the apparatus 200 shown in FIG. 2.

Using the apparatus, systems, and methods disclosed herein may provide the ability to take advantage of noise measurement with only minor changes to the acquisition hardware. For example, an existing acoustic system may be adapted to noise measurement in some cases by disabling transmitter firing, and modifying the data processing scheme to operate as described above. Passive acoustic measurements, as described herein, may increase energy efficiency, provide faster logging speeds with better lateral resolution, and simplify tool design. Tool length may be decreased, while retaining accurate, wideband measurements. Receiver gain estimation and calibration may also be available. The combination of these advantages can significantly enhance the services provided by an operation/exploration company while at the same time controlling time-related costs.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
generating acoustic noise by a passive source comprising at least one of a body of an acoustic tool within a borehole, a positioning device attached to the body, and a measurement device attached to the body;
receiving and recording acoustic noise data at a sampling rate and over a period during movement of the body by at least one receiver attached to the body, wherein the sampling rate is based on a first recorded acoustic frequency and the period is based on a second recorded acoustic frequency that is lower than the first recorded acoustic frequency; and
processing the recorded acoustic noise data to determine a calibration parameter of the at least one receiver.

2. The method of claim 1, wherein the receiving and recording further comprises:
simultaneously receiving and recording the acoustic noise data from a first direction along the body and from a second direction along the body, the second direction being substantially opposite the first direction.

3. The method of claim 1, further comprising:
increasing azimuthal pressure applied to a wall of the borehole by at least one of the positioning device and the measurement device during said receiving and recording.

4. The method of claim 1, further comprising:
increasing an amplitude of the acoustic noise data by increasing logging speed of the down hole tool.

5. The method of claim 1, further comprising:
increasing the amplitude of the acoustic noise data by increasing a cross-sectional area of at least one of the down hole tool, the positioning device, and the measurement device.

6. The method of claim 1, wherein the determining comprises:
determining the calibration parameter by estimating a gain of the at least one receiver.

7. The method of claim 1, further comprising:
calibrating the at least one receiver by applying at least one of a static gain correction parameter corresponding to the acoustic noise data obtained over a cased distance of the borehole and a dynamic gain correction parameter corresponding to the acoustic noise data obtained over an uncased distance of the borehole.

8. The method of claim 1, wherein the processing comprises:
applying at least one of a time semblance method and a frequency semblance method to the acoustic noise data to determine the formation property.

9. The method of claim 1, further comprising:
processing the recorded acoustic noise data using a two-sided frequency semblance method to generate two-sided frequency semblance data; and
converting two-sided frequency semblance data to one-sided frequency semblance data using an absolute value of negative slowness values.

10. The method of claim 1, wherein
at least one of the positioning device and the measurement device is configured as a symmetrical device to excite resonant monopole modes.

11. The method of claim 1, wherein the first recorded acoustic frequency is a highest recorded acoustic frequency and the second recorded acoustic frequency is a lowest recorded acoustic frequency.

12. The method of claim 1, further comprising:
calculating gain for the at least one receiver without using the calibration parameter.

13. An apparatus, comprising:
a passive source configured to generate acoustic noise during movement of the passive source within a borehole, said passive source comprising at least one of a body of an acoustic tool within a borehole, a positioning device attached to the body, and a measurement device attached to the body;
at least one receiver attached to the body and configured to receive and record acoustic noise data at a sampling rate and over a period during movement of the body, wherein the sampling rate is based on a first recorded acoustic frequency and the period is based on a second recorded acoustic frequency that is lower than the first recorded acoustic frequency; and
a processor configured to process the recorded acoustic noise data to determine a calibration parameter of the at least one receiver.

14. The apparatus of claim 13, wherein the first recorded acoustic frequency is a highest recorded acoustic frequency and the second recorded acoustic frequency is a lowest recorded acoustic frequency.

15. The apparatus of claim 13, wherein the processor is further configured to process the recorded acoustic noise data using a two-sided frequency semblance method to generate two-sided frequency semblance data, and convert the two-sided frequency semblance data to one-sided frequency semblance data using an absolute value of negative slowness values.

16. The apparatus of claim 13, wherein the measurement device comprises a caliper and wherein the positioning device comprises a centralizer.

17. A system, comprising:
  an acoustic tool;
  an apparatus attached to a tool body of the acoustic tool comprising,
    a passive source configured to generate acoustic noise during movement of the passive source within a borehole, said passive source comprising at least one of the tool body, a positioning device attached to the tool body, and a measurement device attached to the tool body; and
    at least one receiver configured to receive and record acoustic noise data at a sampling rate and over a period during movement of the tool body, wherein the sampling rate is based on a first recorded acoustic frequency and the period is based on a second recorded acoustic frequency that is lower than the first recorded acoustic frequency; and
    a processor configured to process the recorded acoustic noise data to determine a calibration parameter of the at least one receiver.

18. The system of claim 17, wherein the processor is further configured to process the recorded acoustic noise data using a two-sided frequency semblance method to generate two-sided frequency semblance data, and convert the two-sided frequency semblance data to one-sided frequency semblance data using an absolute value of negative slowness values.

19. The system of claim 17, further comprising:
  at least one acoustic noise isolator attached to the tool body, proximate to the at least one receiver.

20. The system of claim 17, wherein the passive source comprises:
  at least one of the positioning device and the measurement device configured as an asymmetrical device to excite resonant dipole modes.

* * * * *